United States Patent Office 3,539,452
Patented Nov. 10, 1970

1

3,539,452
RED BLOOD CELL ACETYLCHOLINESTERASE TEST
Adrian J. Penicnak, Corona, N.Y., assignor to Chas. Pfizer & Co., Inc., New York, N.Y., a corporation of Delaware
No Drawing. Filed Jan. 23, 1968, Ser. No. 699,790
The portion of the term of the patent subsequent to Apr. 15, 1986, has been disclaimed
Int. Cl. C12k 1/04
U.S. Cl. 195—103.5                      6 Claims

ABSTRACT OF THE DISCLOSURE

The red blood cell acetylcholinesterase test is a simple colorimetric procedure for the determination of red blood cell acetylcholinesterase activity in human blood utilizing a buffer-color developer reagent, an inhibitor reagent and a substrate.

BACKGROUND OF THE INVENTION

This invention relates to a novel diagnostic test. More particularly, it relates to an improved colorimetric method for determining red blood cell acetylcholinesterase activity in human blood. The acetylcholinesterase present in the lysed red blood sample acts on propionylthiocholine releasing thiocholine which in turn reacts with 5,5'-dithiobis-(2-nitrobenzoic acid) producing a yellow color. The reaction is stopped by the addition of excess cetyltrimethyl ammonium bromide followed by the subsequent measurement of the optical density.

The determination of red blood cell acetylcholinesterase is of particular importance when screening individuals who may have suffered toxic effects from organic phosphate insecticides and similar chemicals which can result in depressed levels of enzyme activity.

SUMMARY OF THE INVENTION

This invention broadly comprises the steps of:

(a) Commingling a buffered aqueous solution containing about 0.01% w./v. of 5,5'-dithiobis-(2-nitrobenzoic acid) having a pH of about 7.4 at 37° C. and a lysed solution of red blood cells the volume ratio of said buffered aqueous solution to said lysed solution being approximately 200 to 1;

(b) Adding to the resulting mixture an aqueous solution containing about 0.15% w./v. of a halide salt of propionylthiocholine in an amount sufficient to provide a volume ratio of said aqueous solution to said lysed solution of about 25 to 1; incubating and subsequently adding (c) An amount of an aqueous solution containing about 0.1% w./v. of cetyltrimethyl ammonium bromide sufficient to provide a volume ratio of said cetyltrimethyl ammonium bromide to said lysed solution of about 50 to 1;

and determining acetylcholinesterase activity spectrophotometrically by measuring the optical density at a wavelength of 400 to 420 m$\mu$.

Experimentally, it is preferred to use the following amounts of materials when carrying out the aforedescribed diagnostic test:

|  | Ml. |
|---|---|
| Lysed red blood cell solution | 0.02 |
| 5,5'-dithiobis-(2-nitrobenzoic acid) reagent | 4.0 |
| Propionylthiocholine reagent | 0.5 |
| Cetyltrimethyl ammonium bromide reagent | 1.0 |

2

Of course, it is to be understood that any equivalent volume proportions may be used in lieu of those above, however, the above amounts are preferred since the total resulting volume is appropriate for the subsequent optical density measurements.

With regard to the wavelength at which the optical density measurements are carried out, it is preferred to use a wavelength of 415 m$\mu$, however, a range from 400 to 420 is equally suitable.

DETAILED DESCRIPTION OF THE INVENTION

The herein disclosed diagnostic method determines the amount of acetylcholinesterase activity in human red blood cells wherein said activity is measured spectrophometrically using a spectrophotometer set at a wavelength of from 400 to 420 m$\mu$. The resulting optical density is multiplied by 600 to express acetylcholinesterase activity in units. The acetylcholinesterase units can also be converted to International units by multiplying with the factor 0.011. The International unit is defined as the number of $\mu$ moles of substrate hydrolyzed per minute per ml. of packed red blood cells based on a molar absorptivity of 13,600. The normal range for cholinesterase activity predetermined experimentally by the subject method is from about 210 to about 360 units. An abnormal or low reading, that is less than 210, indicates one of the malfunctions described earlier.

Experimentally, the liagnestic procedure is carried out in the following manner: An 0.02 ml. sample of suspect hemolysate (lysed red blood cells) is mixed with 4 ml. of an 0.01% w./v. aqueous solution of 5,5'-dithiobis-(2-nitrobenzoic acid) (DTNB) having a pH of about 7.4 at 37° C. Said hemolysate is obtained in the following manner: Blood is treated with an anticoagulant such as heparin and the cells which form the bottom layer after centrifugation are separated by decanting the upper layer of liquid plasma and thereafter washed three times with isotonic saline. The separated packed red blood cells are then combined with a lysing agent (saponin-formaldehyde saline solution) in a volume ratio of 1:4 to 1:10 in order to provide hemolysate (lysed red blood cells) which is then ready for subsequent testing.

Experimentally, one generally uses 20$\lambda$ (0.02 ml.) of hemolysate. This results in a concentration of lysed red blood cells of 0.005 ml. for the maximum concentration (1:4) and 0.0018 ml. for the minimum concentration (1:10). The preferred concentration is about 1:5. The aforesaid DTNB is buffered with tris(hydroxymethyl) aminomethane. To this mixture is added a slight excess of an aqueous solution containing about 0.15% w./v. of propionylthiocholine iodide.

Experimentally, 0.5 ml. is added. Mechanistically, the serum acetylcholinesterase reacts with the propionylthiocholine iodide to form thiocholine which then reacts with DTNB to form the yellow anion of 5-thio-2-nitrobenzoic acid. The serum cholinesterase activity is measured preferably after allowing the aforesaid mixture to incubate for 15 minutes at 37° C. The reaction is then terminated by the addition of 1 ml. of an aqueous solution containing about 0.1% w./v. cetyltrimethyl ammonium bromide (inhibitor). The resulting mixture is agitated thoroughly. If cuvettes are not used as containers for the test procedure, the solution is transferred to a typical spectrophotometer cuvette and the optical density determined within 30 minutes. Experimentally, if cuvettes other than 12 m$\mu$ are used, the optical density is converted to a 12 mμ cuvette light path by multiplying by the appropriate factor. The afore described method is well suited to any laboratory adapted for routine determinations.

The folowing examples are given to more fully illustrate the present invention. It is to be understood that these examples are for illustrative purposes only and that the invention is not meant to be limited to the specific details of the example.

PREPARATION OF REAGENTS (A) Buffered aqueous solution containing 0.1% w./v. 5,5'-dithiobis(2-nitrobenzoic acid) (DTNB).—To a one liter flask is added 100 mg. of DTNB and 6.64 g. of NaCl. To this solution is added 650 ml. of an HCl-Tris mixture (prepared by combining 400 ml. of 0.1 N HCl and 250 ml. of 0.2 M tris(hydroxymethyl amino-methane (Tris) solution. Without stirring, sufficient distilled water is then added to give a 1 liter solution. The mixture is then stirred to permit dissolution of all reagents, and adjusted to a final pH of 7.4. If below 7.4, 1 N NaOH is used whereas if the mixture is above 7.4, 1 N HCl is added.

(B) Propionylthiocholine iodide.—To approximately 600 ml. of distilled water in one liter volumetric flask is added 7.5 g. of propionylthiocholine iodide with stirring to allow dissolution, followed by the addition of sufficient water to give a 1 liter solution. This solution is dispersed into vials, each vial receiving 1 ml. of solution. Lyophilization of these vials are out at a temperature of 70–80° F. When ready to use, the vial is reconstituted with 5.0 ml. of distilled water resulting in a 0.15% w./v. solution (1.5 mg./ml.).

(C) Cetyltrimethyl ammonium bromide.—To approximately 600 ml. of distilled water in a one liter volumetric flask is added 1.0 g. of cetyltrimethyl ammonium bromide with stirring to allow dissolution, followed by the addition of sufficient water to provide a 1 liter solution.

EXAMPLE I

A sample of hemolysate (lysed red blood cell)[1] (0.02 ml.) is combined with 4.0 ml. of reagent A as prepared by the procedure outlined above. If foaming occurs, the foam is allowed to dissipate before proceeding further. Reagent B (0.5 ml.) is then added and the reaction mixture agitated and allowed to incubate for 15 minutes at 37° C. Reagent C (1.0 ml.) is then added, the resulting mixture mixed well and the solution transferred to a 12 mm. spectrophotometer cuvette. The wavelength of the spectrophotometer is set at 415 mμ, adjusted to zero optical density with a blank, and the optical density of the sample determined.

The optical density experimentally is 0.500 which is multiplied by 600 to express acetylcholinesterase activity in "units." Hence, the sample contains 300 acetylcholinesterase units.

EXAMPLE II

The procedure of Example I is repeated wherein propionylthiocholine bromide is used in preparing Reagent B instead of propionylthiocholine iodide. Equivalent results are obtained.

[1] The lysing techniques utilizes a saponin-formaldehyde saline solution as described by E. L. Pruden and M. E. Winstead, Amer. J. Med. Tech. 30, 1 (1964).

EXAMPLE III

The procedures of Example I and II are repeated wherein the following amounts of sample and reagents are used:

(I)

| | Ml. |
|---|---|
| Sample | 0.04 |
| Reagent A | 8 |
| Reagent B | 1 |
| Reagent C | 2 |

(II)

| | |
|---|---|
| Sample | 0.08 |
| Reagent A | 16 |
| Reagent B | 2 |
| Reagent C | 4 |

Equivalent results are obtained.

What is claimed is:

1. An improved method for determining red blood cell acetylcholinesterase activity in human blood which comprises the steps of:
  (a) commingling a buffered aqueous solution containing about 0.1% w./v. of 5,5'-dithiobis-(2-nitrobenzoic acid) having a pH of about 7.4 at 37° C. and a solution of isolated and lysed red blood cells, the volume ratio of said buffered aqueous solution to said lysed solution being approximately 200 to 1;
  (b) adding to the resulting mixture an aqueous solution containing about 0.15% w./v. of a halide salt of propionylthiocholine in an amount sufficient to provide a volume ratio of said aqueous solution to said lysed solution of about 25 to 1; incubating and subsequently adding
  (c) an amount of an aqueous solution containing about 0.1% w./v. of cetyltrimethyl ammonium bromide sufficient to provide a volume ratio of said cetyltrimethyl ammonium bromide to said lysed solution of about 50 to 1;

and determining acetylcholinesterase activity spectrophotometrically by measuring the optical density at a wavelength of 400 to 420 mμ.

2. The method of claim 1 wherein said buffering agent is tris(hydroxymethyl)aminomethane.

3. The method of claim 1 wherein said halide salt of propionylthiocholine is propionylthiocholine iodide.

4. The method of claim 1 wherein said incubating period is 15 minutes at 37° C.

5. The method of claim 1 wherein said lysed solution of red blood cells contains from about 0.0018 ml. to about 0.005 ml. of red blood cells.

6. The method of claim 1 wherein the amounts of said lysed solution, said 5,5'-dithiobis-(2-nitrobenzoic acid) solution and said cetyltrimethyl ammonium bromide solution are 0.02 ml., 4 ml. and 1 ml., respectively.

References Cited

UNITED STATES PATENTS 3,438,866    4/1969    Penichak.

A. LOUIS MONACELL, Primary Examiner

M. D. HENSLEY, Assistant Examiner